United States Patent [19]

Lebduska

[11] 4,078,852
[45] Mar. 14, 1978

[54] RADIANT ENERGY COUPLER

[75] Inventor: Robert L. Lebduska, La Mesa, Calif.

[73] Assignee: The United States of America as represented by the Secretary of the Navy, Washington, D.C.

[21] Appl. No.: 722,895

[22] Filed: Sep. 13, 1976

[51] Int. Cl.$^2$ .................................................. G02B 5/16
[52] U.S. Cl. .................... 350/96.18; 350/96.23; 350/96.24
[58] Field of Search ............... 350/96 C, 96 B, 231, 350/54

[56] References Cited

U.S. PATENT DOCUMENTS

| 2,540,953 | 2/1951 | Kessler, Jr. ........................... 350/231 |
| 3,508,807 | 4/1970 | Mayer .................................. 350/96 C |
| 4,011,005 | 3/1977 | Hawkes et al. ....................... 350/96 C |

FOREIGN PATENT DOCUMENTS

| 1,017,354 | 6/1966 | United Kingdom ............. 350/96 C |
| 1,429,843 | 3/1976 | United Kingdom ............. 350/96 C |

*Primary Examiner*—John K. Corbin
*Assistant Examiner*—Stewart Levy
*Attorney, Agent, or Firm*—R. S. Sciascia; G. J. Rubens

[57] ABSTRACT

A coupler for connecting a radiant energy transmitting element to a radiant energy receiving element which utilizes a specially designed lens for each element, said lenses having spherical convex segments positioned in close face-to-face relationship so that the radiant energy emerging from the transmitting element is treated as a point source which is sequentially defocused and focused by means of the lenses onto the receiving element to minimize refraction and other losses and to insure maximum coupling efficiency.

2 Claims, 4 Drawing Figures

RADIANT ENERGY COUPLER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to radiant energy transmission, and more particularly to a more efficient coupler for the junctions of fiber optics cables.

The employment of fiber optic cables for various types of communication systems has become a rapidly expanding art. And, as would be expected much development has been devoted to the production of low-loss glass materials and cables, and the design of couplers for joining such cables. Coupling members have been proposed to optimize coupling efficiency which is a necessary objective if optical communication is to be feasible when applied to long cable systems and/or multi-port applications.

To increase coupling efficiency, the principal thrust of the prior art has been directed to reducing Fresnel losses by minimizing the separation distance between axially aligned cable junctions by creating so-called "butt junctions." However, such designs possess fundamental coupling deficiencies in the inability to align a multiplicity of randomly oriented small diameter fibers on a one-to-one basis between the transmitting cable junction and the receiving cable junction, considering the high packing fraction losses resulting at the latter junction.

The present invention is directed to the unique concept of treating the entire bundle of fibers at the cable junctions as point sources of propagating and receiving energy rather than a multiplicity of energy sources. This objective is achieved by the use of a specially designed optical lens which also reduces extraneous internal and external energy reflections through and between the lenses to enhance the efficiency of the coupler.

In the past, some fiber optic couplers have utilized optical lens for combining optical rays. For example, U.S. Pat. No. 3,508,807 teaches the combining of different colored light from three light bundles into white light in a single bundle through the use of a pair of plano-convex lens which of necessity are spaced from each other and from the respective ends of the fiber optic cable junctions to provide a mixing of the colors. There is no recognition in this patent of the high transmission losses caused by the various air/lens interfaces which exist in patentee's construction because the primary interest is to mix various colors.

A similar light coupler is shown in U.S. Pat. No. 3,912,364 for combining two light transmitting cables into a single light cable through a double convex lens mounted in an enclosure and spaced from the cable junctions, the latter located at the focal points of the lens. This device projects a multiplicity of light beams, and the large lens/air interfaces causes high light losses in the light combiner.

SUMMARY OF THE INVENTION

The novel coupler reduces radiant energy refractive losses that occur between the junctions of a transmit fiber optic cable and a receive fiber optic cable. These improved results are achieved by use of a pair of lenses, one for each cable, which lenses are dimensioned with reference to factors, such as the numerical aperture of the fiber optic cables, their bundle diameters, dimensions of the coupler enclosure, and to some degree on the refractive index of the transparent lens material.

Each lens is constructed with a plano surface at one end adapted to abut the respective fiber cable junctions, and a portion of a convex spherical surface at the other end. Each convex surface is adapted, preferably, to abut each other in facing relationship, to form in effect a double concavo air space therebetween of minimum size.

An important consideration is the dimensioning of the lenses so that the full diameter of the propagated conical energy beam appearing at the convex surface is substantially larger with respect to the diameter of the respective fiber cable bundle junction, making the entire bundle of discrete fibers to appear relatively as a point-source of the energy rather than a multiplicity of different light sources. The total length of each lens member can be determined from the formula $L = R[\eta c/_\eta c - 1]$ where R is the radius of the convex surface, and $\eta c$ is the refractive index of the selected lens material.

Having the aforedescribed design and arrangement of the lenses, the propagated energy beam from the transmit fiber optics cable junction will be sequentially defocussed by the first lens, the emitting rays projected parallel through the air interface between the convex surfaces, and finally the radiation focused by the second lens on the receive fiber optic cable. This path is achieved with a minimum of refractive losses. Optimum coupling of the radiant energy across the air interface between the lens elements can be obtained by applying anti-reflection and/or index matching coatings on the convex surfaces of the lens elements.

STATEMENT OF THE OBJECTS

A principal object of this invention is to provide a coupler which will more efficiently couple radiant energy, both visible and invisible, propagated across a junction by reducing refractive losses therethrough.

Another important object is to provide such a coupler that can connect single or multiple fiber cables.

Still another important object is to construct a lens that will make the transmitted radiant energy source appear as a point source of energy.

Other objects, advantages and novel features of the invention will become apparent from the following detailed description of the invention when considered in conjunction with the accompanying drawings.

DESCRIPTION OF PREFERRED EMBODIMENT

Figure 1:
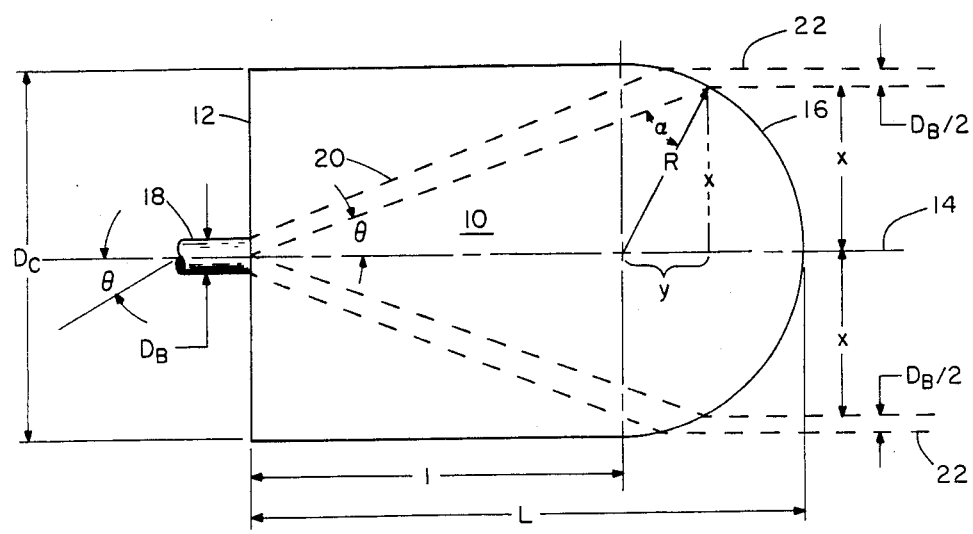
FIG. 1 is a side elevation of a single lens of the type employed in the novel coupler illustrating the principle of operation and design characteristics.
Figure 2:
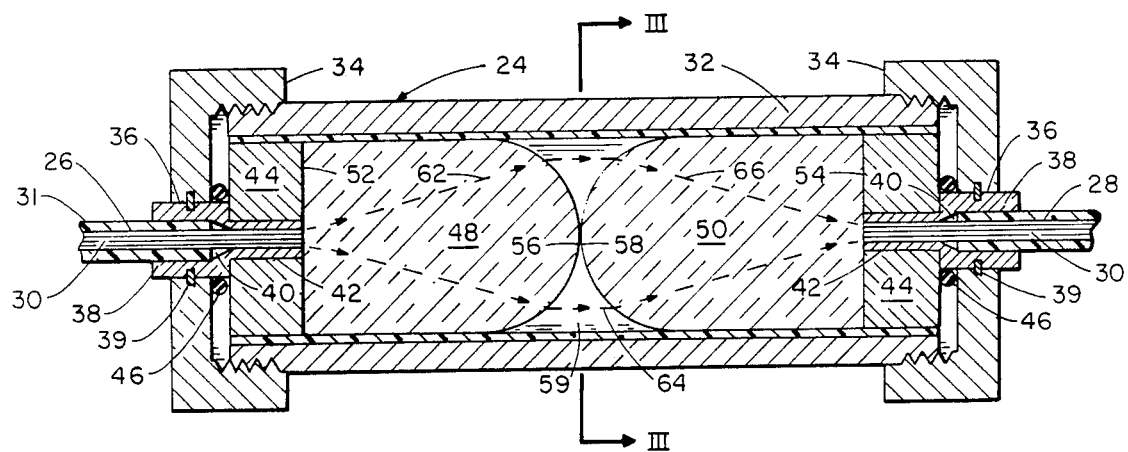
FIG. 2 is a longitudinal sectional view of a typical fiber optic cable coupler employing the lens of FIG. 1.
Figure 3:
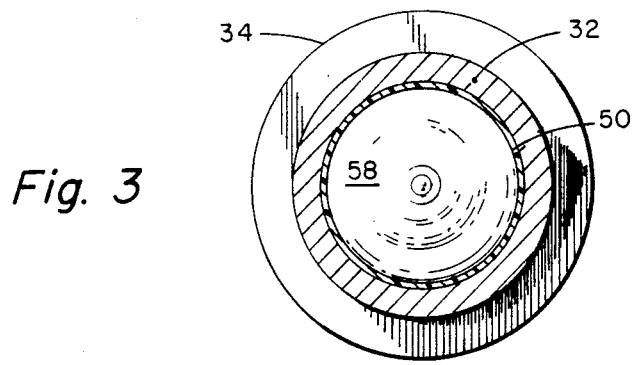
FIG. 3 is a cross-sectional view taken along line III—III of FIG. 2.
Figure 4:
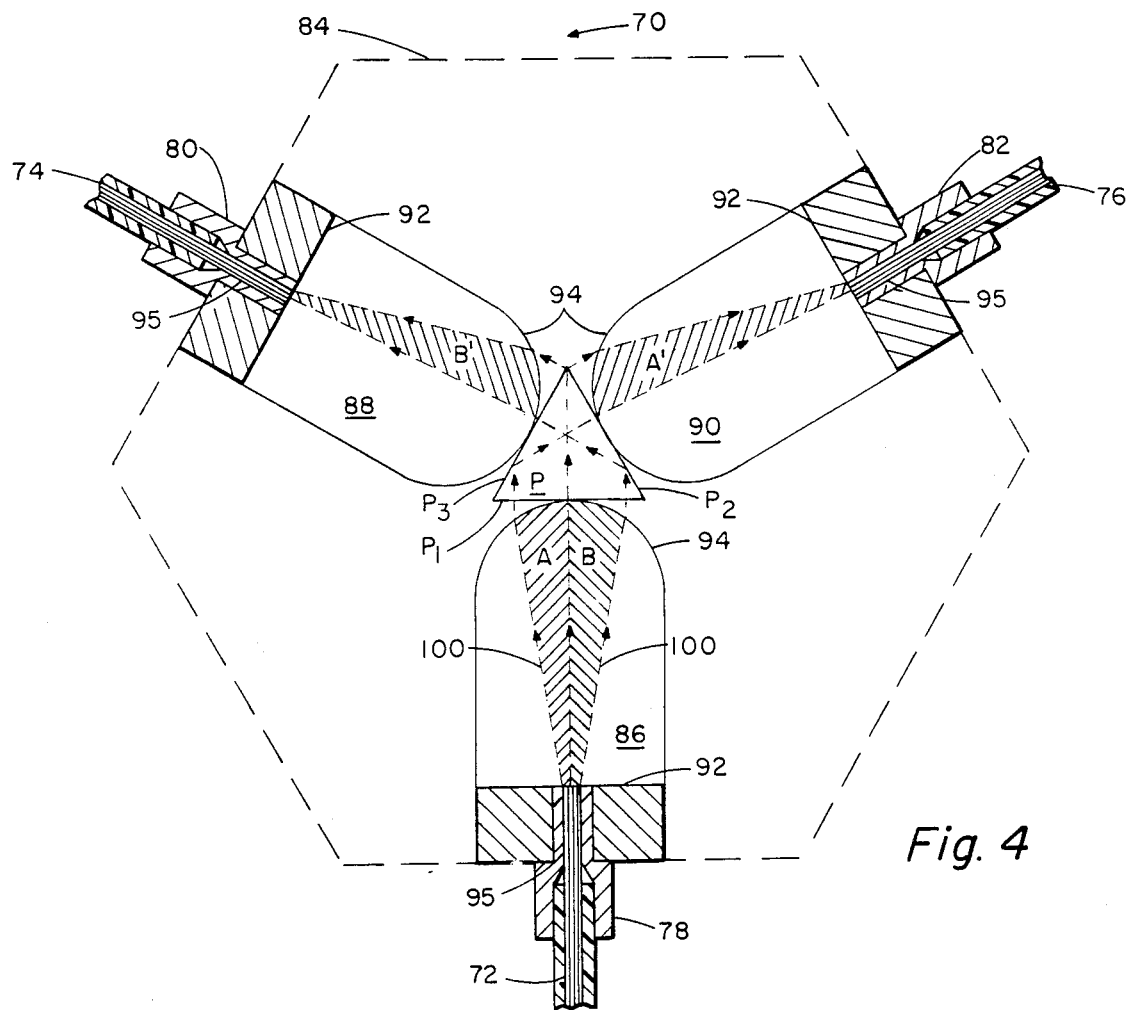
FIG. 4 is a longitudinal sectional view of a modified coupler used as a "Y"-type energy combiner.

Referring to the drawings where like reference numerals refer to similar parts throughout the figures, there is shown in FIG. 1 a unique optical lens 10 which is an important component of the fiber optics cable couplers shown in FIGS. 2-4.

Lens 10 is fabricated of any optically clear and polishable material having a refractive index that will satisfy the specific design requirement of the coupler, as will be described. One end of lens 10 is provided with a polished plano-surface 12 normally formed perpendicular to longitudinal axis 14 of the lens element. The other end of lens 10 is provided with a portion of a polished convex, hemispherical surface 16.

As shown in FIG. 1, the lens surface 12 is adapted to be positioned adjacent to a radiant energy transmitting and/or receiving member, i.e., fiber optics cable bundle 18, which is to transmit either visible or invisible radiant energy. The energy emerging from bundle 18 forms a conical shaped beam 20. The significant physical properties of lens 10 are illustrated in FIG. 1 and defined by the following symbols:

R = radius of hemispherical lens surface
L = total length of the lens
$l = L - R$
$\eta c$ = index of refraction of the lens material
$\theta c$ = one-half conical beam angle in lens
$\theta$ = one-half of the maximum acceptance angle of bundle 18
NA = numerical aperture of bundle 18 (sine $\theta$)
$D_B$ = diameter of fiber optic cable bundle 18
$x$ = approximately one-half diameter of beam, i.e., (beam width $- D_B/2$)
$\alpha$ = critical angle of lens = $\sin^{-1}(1/\eta c)$ It has been found that when the diameter ($2x$) of radiant beam 20 is large compared to bundle diameter $D_B$, the energy entering lens 10 can be considered as a point source of radiation. The emitting cone-shaped beam 20 emerges from convex surface 16 in parallel rays 22 when the following relationship exists:

$$R/l = \eta c - 1; \tag{1}$$

It has also been found that when the sine of the acceptance angle $\theta$ (NA) is equal or less than $R/l$, no internal critical angle reflections or back scattering will occur within the lens 10. Therefore, if the acceptance angle of bundle 18 is equal or less than $\eta c - 1$, substantially more energy will pass through lens 16 and emerge in parallel relationship for coupling purposes. The radiant energy beam diameter is shown in FIG. 1 to be exactly equal to $2(x + D_{B/2})$ or $2x + D_B$. Since the value of $D_B$ is small compared to $2x$, for simplicity it can be omitted in the following calculations. The value of $x$ is calculated from FIG. 1 as:

$$x = R \sin\left[\sin^{-1}\left(\frac{\sin \theta}{\eta c}\right) + \sin^{-1}\left(\frac{1}{\eta c}\right)\right] \tag{2}$$

The above formula defines the maximum value for $x$ at the critical angle $\alpha$. For example, assuming the lens material is glass having a $\eta c = 1.5$, and the value of R is chosen as 1.25 inches and $l$ is chosen as 2.50 inches, the value of $x - 1.096$ inches (to which must be added $D_{B/2}$ to obtain one-half of the full beam diameter).

Assuming the lens material is sapphire having a $\eta c = 1.76$ with the same values of R and $l$ as given above, the value of $x = 0.973$ inch.

The total length of lens 10 can also be determined from FIG. 1 where:

$$\tan \theta_c = \frac{x}{l + y}; \text{ and} \tag{3}$$

$$\theta_c = \sin^{-1}\left(\frac{\sin \theta}{\eta c}\right); \text{ also} \tag{4}$$

$$Y^2 = R^2 - x^2 \text{ or} \tag{5}$$

$$Y = (R^2 - x^2)^{\frac{1}{2}} \text{ and} \tag{6}$$

$$l = L - R; \text{ and subst in (1) (6)} \tag{7}$$

$$\tan\left[\sin^{-1}\left(\frac{\sin \theta}{\eta c}\right)\right] = \frac{x}{l + Y}; \text{ or} \tag{8}$$

$$\frac{x}{(L-R) + (R^2 - x^2)^{\frac{1}{2}}} = \frac{x}{L - R + R^2} \tag{9}$$

$$L - R + (R^2 - x^2)^{\frac{1}{2}} = \frac{x}{\tan\left[\sin^{-1}\left(\frac{\sin \theta}{\eta c}\right)\right]} \tag{10}$$

$$L = R - (R^2 - x^2)^{\frac{1}{2}} + \frac{x}{\tan \sin^{-1}\left(\frac{\sin \theta}{\eta c}\right)} \tag{11}$$

This is the general equation relating $\theta$ with L, R, $x$, and $\eta c$.

We can now select a beam width ($2x$) for a known $\theta$ and $\eta c$ and trade off values for L and R.

Example: $\eta c = 1.5$ (glass), Let $x = 0.125$ inch

With selected values for R, and substituting in formula (11) the values of L are tabulated below in Table I for the known range of existing low loss and high loss optical fibers:

Table I

| Low loss $\theta = 10°$ | | High loss $\theta = 30°$ | |
|---|---|---|---|
| R | L | R | L |
| 1″ | 1.081″ | 2″ | 0.358″ |
| 0.5″ | 1.089″ | 1″ | 0.362″ |
| 0.25″ | 1.106″ | 0.5″ | 0.370″ |

From the above tabulation it is apparent that the values of L are, as a practical matter, relatively independent of the values of R.

However, the values of L are dependent, in an inverse manner, on the values of the input fiber bundle acceptance angle, $\theta$.

Referring to formula (11) and to table II it can be shown that the sum $R - (R^2 - x^2)^{\frac{1}{2}}$ approaches zero especially when $x$ is small with respect to R; therefore L can be said for all practical purposes to vary inversely with the acceptance angle as shown tabulated below in Table II.

Table II

| $\theta$ | L |
|---|---|
| 10° | 1.1″ approx |
| 20° | 0.53″ approx |
| 30° | 0.36″ approx |

In some coupler applications it may be necessary to connect two or more fiber optic elements of varying diameters. Assuming the radius of the lenses are the same as is their material, it can be seen from FIG. 1 that their respective lengths are inversely proportional to their respective acceptance angles ($\theta$).

FIGS. 2 and 3 illustrate a coupler 24 for joining a fiber optic transmit cable 26 to a fiber optic receive cable 28, both cables having fiber bundles 30 of the same diameter, being the usual type of installation. The fiber bundles are enclosed within a plastic jacket 31 in a well known manner. The coupler comprises a tubular housing 32, which may be of suitable material having threaded ends to receive end coupling nuts 34 having bore openings 36 to receive the respective cables. Each cable terminates in a bundle terminal ferrule 38 secured in coupling nut 34 by retaining rings 39, the ferrule having a tapered bore 40 leading to a neck portion 42 in which the bared fibers are secured by epoxy or the like. The bared ends of the fibers and the ferrule end are polished in a manner well known in the art. Each ferrule neck 42 is housed in a respective ring-shaped block 44, made of suitable material snugly fitting and epoxied within the end of housing 32 for the purpose of aligning the fiber optic bundle within the coupler which is an important consideration. Each alignment block 44 is sealed within the housing by "O" rings 46.

In the species of FIGS. 2 and 3, the optical lenses 48 and 50 are of identical design and composition, as are fiber optic cables 26 and 28. Each lens is adapted to be snugly fitted within housing 32 with the longitudinal axis of the lens aligned with its respective fiber optics cable.

Flat ends 52 and 54 of the lens are positioned preferably abutting their respective bundle ends to minimize light losses across the junctions. The opposite ends of lenses 48 and 50 are provided with convex spherical portions 56 and 58, respectively, being disposed within the housing in face-to-face relation. The convex portions are preferable at a point contact to provide a minimum air gap 59, to achieve a minimum of light losses therebetween. The specification and dimension of lenses 48 and 50 are selected for any given installation in accordance with the previous calculations described with reference to FIG. 1.

Referring to FIGS. 2 and 3, the assembled coupler functions in the following manner. Radiant energy emitting from the end of transmitting cable bundle 30 propagates through lens 48 in a defocussing, conical shaped beam 62. The emitting energy is the sum of the radiant energy beams of the individual transmitting fibers of the optical bundle. As the diameter of lens 48 is relatively large with respect to the bundle diameter 30, the area of the latter can be treated as a point source of energy and the classical optical focusing methods may be employed for containment and optical processing of the radiant energy, minimizing Fresnel losses. That is, the lens is so designed that all the emitting light from bundle 30 is confined within the conical beam so that no energy is lost by being internally reflected within that region of the lens outside the beam.

External energy rays 64 of beam 62 leaving the spherical portion 58 all pass through air gap 59 in parallel, axial alignment minimizing any losses by reflection with the inside walls of housing 32. As previously described, in communication systems the size of the air gap 59 should be kept at a minimum to minimize energy losses between the air/lens interface. Parallel energy rays 64 are then refracted by lens 50 in a focusing conical beam 66 onto the polished face of receiving fiber bundle 30. The transmitting and receiving cables 26 and 28, respectively, illustrated in FIG. 2 are of the same diameter, however, in certain special installations they may be of different sizes and the same advantageous parallel transmission through the air/lens interface can be utilized by changing the physical characteristics of the respective lens according to formula (1) herein described. If desired, the convex surfaces 56 and 58 of the respective lenses can be coated with an anti-reflection coating which should further improve the coupling efficiency.

Another species of the invention is shown in FIG. 4 wherein the coupler 70 is fabricated in a "Y" shaped configuration suitable for use as an energy combiner or mixer, or, conversely, as a light splitter. In this version three fiber optic cables 72, 74, 76 are circularly disposed each spaced apart 120°, and supported by respective cable terminals 78, 80, and 82 in a suitable housing 84.

As in the coupler of FIGS. 2 and 3, lens members 86, 88, and 90, each have a plano surface 92 at one end and a portion of a convex spherical surface 94 at the other end. The plano surfaces 92 are each placed in abutting relation to a mixer rod 95 which in turn abuts the respective bared ends of the fiber bundles. Rod 95 consists of a short section of cladded glass (less than one inch in length) having an inner core diameter equal to fiber bundle diameter. Mixer rod 95 is aligned and epoxied accurately to the fiber bundle terminal and due to the refractive index match will provide negligible energy loss at the interface. Each convex lens surface 94 abuts the face of a solid equilateral prism P constructed of glass or other suitable optically transparent material. Each of the three flat prism faces $P_1$, $P_2$ and $P_3$ are disposed normal to the longitudinal axes of the respective fiber optic cables, and dimensioned to be equal to the radiant beam diameter, i.e., $2x + D_B$.

The angular aperture of radiant energy propagating within the fibers of transmit bundle 72 will be preserved by the glass/epoxy interfaces through mixer rod 95 and lens member 86. As shown by the arrows, the energy rays 100 reaching the convex surface 94 will be refracted by the air interface to provide perpendicular impingement upon the respective face of prism P. The ray's energy will enter the prism with minimum loss due to the normal incidence of impingement. Therefore in operation defocussing radiant energy within the shaded half-cone region denoted A of input lens 96 in FIG. 4 will pass perpendicularly through prism face $P_1$, be totally reflected by prism face $P_3$, pass perpendicularly through prism face $P_2$, and impinge on convex surface 94 of lens 90. This energy then is refracted by the change in index from air to glass and focused back through half-cone region A' of lens 90 to coupling stub 95 and transmitted thereby to output fiber optic cable bundle 76. It is therefore obvious that the long energy rays 100 on the outer side of the half cone A will be reflected by prism side 22 to the short length of half cone A'. Thus the prism balances the length of the rays being propagated through the coupler.

A similar energy transmission path occurs with half-cone region B in input lens 86, which energy will be concentrated on output fiber optic bundle 74 via the respective prism faces $P_1$, $P_2$ and $P_3$.

Accordingly, coupler 70 enables the energy emitted in input fiber optic cable 72, minus minimum coupler losses, to be split, half of the energy appearing at both output fiber optic bundles 74 and 76. A similar result will occur in transferring of energy from any one of the cables to the remaining two cables. Conversely, the coupler can be used to combine the energy transmitted in two of the cables into the third cable. As in the embodiment of FIG. 1, an anti-reflection coating can be applied to the lens members and the prism.

The present invention provides a unique lens particularly suited for fiber optic transmissions to minimize energy losses in the transmission of the energy being coupled from a transmitting element to receiving element. By providing a more efficient coupler, fiber optic systems applications heretofore marginally limited, are now feasible. The coupler and components are inexpensive, yet rugged in construction.

Obviously many modifications and variations of the present invention are possible in the light of the above teachings. It is therefore to be understood that within the scope of the appended claims the invention may be practiced otherwise than as specifically described.

What is claimed is:

1. A coupler for optically connecting three fiber optic cables having their longitudinal axes angularly oriented with respect to each other comprising:
    an enclosure;
    a lens for each cable, each lens being longitudinally aligned in said enclosure with the longitudinal axes of respective cables;
    each lens having a plano surface at one end positioned adjacent a respective cable end, and at least a portion of a convex spherical surface at the other end thereof;
    the total longitudinal length of each of said lenses being determined by the formula;

$$L = R \, nc/nc - 1,$$

where
    $R$ = radius of the spherical surface and
    $nc$ = refractive index of the lens material
    a equallateral triangular prism having flat sides; each prism side being positioned in close proximity to a respective spherical lens surface, and perpendicular to the longitudinal axis of a respective lens member, providing an air gap therebetween;
    one of said lens members capable of transmitting a conically-shaped energy beam expanding in diameter from its respective cable and toward its spherical surface and projecting a circular shaped energy pattern through the air gap on its respective flat side of the prism;
    the full beam diameter at its respective spherical lens surface being substantially greater than the diameter of the respective cable end to enable the latter to appear relatively as a point energy source;
    the other two flat sides of the prism capable of each reflecting one half of said circular energy pattern to an oppositely positioned lens, each lens propagating a half conical energy beam longitudinal therethrough to its respective cable end; the radiant energy being propagated through the air gaps between said spherical lens surfaces and the respective prism sides extending in parallel relation with the longitudinal axes of the respective lenses;
    whereby a radiant energy beam propagated in one fiber optic cable can be split by the prism among two other angularly related fiber optic cables with minimum energy losses, and achieving an averaging in the length of the energy rays being propagated.

2. The coupler of claim 1 wherein said prism sides are longer than the diameter of the circular energy beam being propagated.

* * * * *